(No Model.)
A. M. RODRIGUEZ.
ELECTRIC LIGHT FOR VEHICLES.
No. 583,945.                    Patented June 8, 1897.
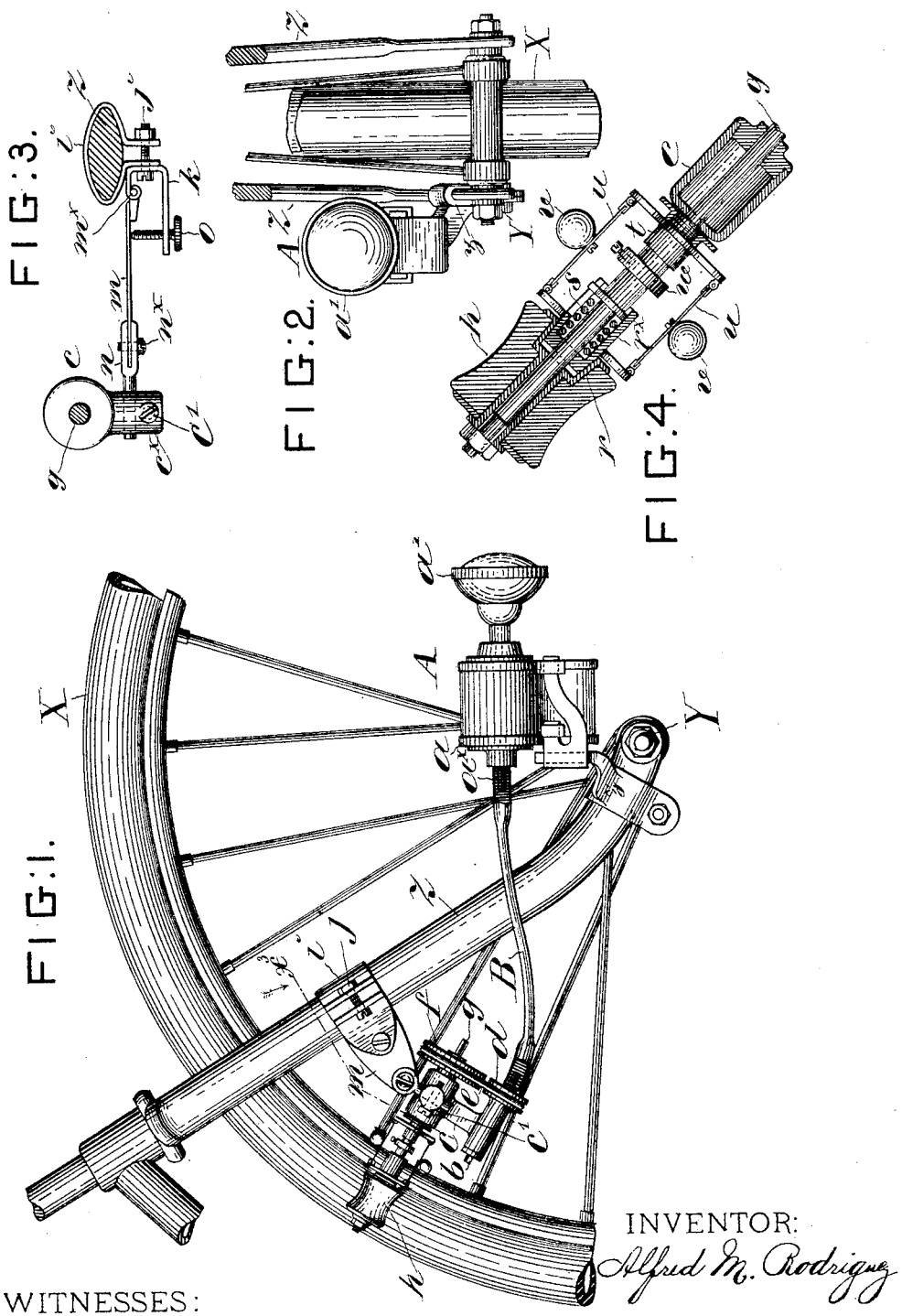

UNITED STATES PATENT OFFICE.

ALFRED M. RODRIGUEZ, OF BROOKLYN, NEW YORK.

ELECTRIC LIGHT FOR VEHICLES.

SPECIFICATION forming part of Letters Patent No. 583,945, dated June 8, 1897.

Application filed October 7, 1896. Serial No. 608,085. (No model.)

*To all whom it may concern:*

Be it known that I, ALFRED M. RODRIGUEZ, a citizen of the United States, residing at Brooklyn, Kings county, New York, have invented certain new and useful Improvements in Electric Lights for Vehicles, of which the following is a specification.

My invention relates to the class of incandescent electric lights wherein the dynamo of the lamp is driven from a wheel of a bicycle or other similar vehicle, but more especially where driven from the rubber tire of a bicycle-wheel; and the object of the invention is, in part, to drive the dynamo of the lamp from a friction-wheel in peripheral contact with the tire of a wheel or rotative part of the bicycle through the medium of a flexible shaft, and in part to provide a speed-regulator whereby excessive speed of the bicycle shall not act injuriously on the dynamo or lamp.

In the accompanying drawings I have illustrated an embodiment of my invention.

Figure 1 is a side elevation of the lamp and driving mechanism represented as mounted on a bicycle; and Fig. 2 is a front elevation of a part of the same, showing the lamp as seen from the front. Fig. 3 is a face view of the driving mechanism as seen from arrow $x^3$ in Fig. 1. Fig. 4 is a sectional detail view of the mechanism for regulating the speed, drawn to a larger scale than the other views.

Let X represent the pneumatic tire of the front wheel of a bicycle, Y the axle of the wheel, and Z the fork in which the wheel is mounted.

A represents, as a whole, the electric lamp, of which $a$ is the case containing the dynamo, and $a'$ is the reflector and lens. I have not shown the interior of this lamp, as similar forms of bicycle-lamps are now quite well known. I need only say that the field-magnet of the dynamo is a permanent magnet and that the light is produced by a small bulb incandescent light of a known kind arranged in front of a reflector and behind a lens or glass. The arbor $a^\times$ of the armature of the dynamo projects through and has a bearing in the case $a$, and to it is secured one extremity of a flexible shaft B, the other end of which is shown in Fig. 1 as coupled to the end of a counter-shaft $b$, mounted in bearings in a bracket $c$, carried on the fork Z of the bicycle. On the counter-shaft $b$ is secured a sheave $d$, and this sheave is driven by a belt $e$ from a larger sheave $f$, fixed on a driving-shaft or arbor $g$, which also has its bearings in the bracket $c$. On the shaft $g$ is mounted a friction-wheel $h$, the periphery of which is in frictional contact with the tire X of the bicycle-wheel. Preferably the wheel $h$ will be of rubber or be faced with rubber and will have the concave form shown in the drawings, so that it will fit the convex surface of the tire X.

The lamp A is mounted removably on the lamp-bracket $z$ of the bicycle in any convenient manner. As here shown, the bracket $z$ is mounted adjustably on a branch of the fork Z, but this is not essential to my invention.

Fig. 3 shows the clip $i$, which secures the bearing-bracket $c$ to a branch of the fork Z. This clip embraces the branch and is held by a clamping-bolt $j$. A bracket-plate $k$ of U shape is secured to the clip $i$, and to one arm of this plate $k$ is hinged at $m^\times$ a spring-plate $m$. At its other end this spring-plate is pivotally or adjustably secured to a block or end piece $n$ by a clamp-screw $n^\times$, and the end piece has a pin which enters a clamp $c^\times$ on the bracket $c$, wherein it is removably and adjustably secured by a clamp-screw $c'$. The pivoting clamp-screw $n^\times$ enables the shaft $g$ to be set radially with the bicycle-wheel, and the clamp-screw $c'$ enables the bearing-bracket $c$ to be turned about the pin on the end piece $n$ to adapt the wheel $h$ to the tire of the bicycle-wheel. The spring-plate $m$, being hinged to the clip $i$, enables the friction-wheel $h$ to be set up to the tire of the bicycle-wheel, and spring-pressure to hold the said friction-wheel up to the tire with the desired degree of pressure is obtained by means of a tension set-screw $o$, which screws through a branch of the bracket-plate $k$ and bears on the outer face of the spring-plate $m$.

The only object of the counter-shaft $b$, sheave $d$, belt $e$, and driving-sheave $f$ is to multiply speed. The flexible shaft B, which may be of the usual kind, is adapted to be fitted tightly but removably onto the projecting ends of the shafts $b$ and $g$ and arbor $a^\times$ at its ends, and in case sufficient speed can be obtained said flexible shaft B may be secured to the end of the shaft $g$ direct. If the bicycle is intended for racing or rapid running, the flexible shaft B may be secured directly to the end of the shaft $g$ and the belt $e$ be removed; but for ordinary slower riding it will be secured to the counter-shaft $b$, so as to insure enough speed in the armature of the dynamo to get the proper amount of light.

In Fig. 1 the flexible shaft B is broken away in part to show the wire coils at its ends which embrace the shafts it connects frictionally and tightly enough to transmit the necessary power to the lamp.

In the case of a bicycle having a pneumatic tire I prefer that the wheel $h$ shall bear thereon, but it may bear on some other part of the wheel, as the rim, for example.

It is desirable and even necessary in a device of this character to employ a device whereby the speed may be so controlled and regulated that the armature of the dynamo can only attain a certain speed, no matter what may be the speed of the wheel of the bicycle or other vehicle. Otherwise the excessive speed of the armature will injure or destroy the effectiveness of the lamp. I have shown herein, and particularly in Fig. 4, a suitable regulator for this purpose, which comprises a spring friction-clutch, which holds the friction-wheel $h$ fast to its shaft $g$ at normal speeds up to a certain limit, and a governor, which, when said limit of speed is exceeded, allows the wheel $h$ to slip on its shaft, thereby protecting the dynamo.

Referring particularly to Fig. 4, the wheel $h$, mounted loosely and collared on the shaft $g$, has in its end the female member $r$ of a friction-clutch, of which the male member $r^x$ is mounted to slide along the shaft $g$, but compelled to rotate therewith by a spline device. Within the hollow base of the member $r^x$ is a spring $s$, which abuts against a shoulder on the shaft $g$ and tends always to keep the clutch members frictionally engaged, so that the wheel $h$ will drive the shaft $g$. On the shaft $g$ is a sliding collar $t$ with lugs, and coupled to these lugs at one end and to lugs on the male clutch member $r^x$ at the other end are springs $u$ $u$, each carrying a governor-ball $v$.

So far as described the operation is as follows: The friction-wheel $h$ drives the shaft $g$ through frictional contact of the clutch members, such contact being produced by the spring $s$, and when the governor-balls $v$ fly out, curving the springs $u$, the spring $s$ resists movement of the clutch member $r^x$ and the collar $t$ is moved along the shaft $g$ toward the wheel $h$; but when a certain predetermined speed is reached the collar $t$ is arrested by a stop-collar $w$ or some equivalent stop fixed adjustably on the shaft $g$, and the governor-balls then act to draw back the clutch member $r^x$ against the resistance of the spring $s$ and to free the friction-wheel $h$ from the shaft $g$. The effect, however, is not to arrest the rotary motion of shaft $g$, but to maintain it at the predetermined speed. The maximum speed at which it is desired the shaft $g$ shall run is regulated by the adjustment of the stop-collar $w$ along the shaft $g$.

I do not limit myself to the particular construction of the parts herein shown, as these may be varied to some extent without departing from the invention. One important feature is the adaptation to the lamp of a flexible driving-shaft which enables the lamp to be mounted at various points on the wheel without interfering with the driving mechanism. Some riders, for example, prefer to mount the lamp at the hub or on a branch of the fork near the hub, while others prefer to mount it on the stem above the fork, and the flexible shaft permits of placing it in almost any position. The speed-regulator is adapted to any electric bicycle-lamp of this general character.

I do not claim the special form of ball-governor herein shown, as it is well known, nor do I limit myself to this particular form.

In some cases, and especially where the device is designed for use on carriages or wagons, a storage battery may be arranged between the dynamo and the lamp proper, so that the battery may supply a current to the filament of the incandescent lamp when the motion of the carriage is temporarily arrested. This is not so important with a bicycle.

Having thus described my invention, I claim—

1. The combination with a wheeled vehicle and an electric lamp and generator mounted thereon, of a friction-wheel rotatively mounted on the vehicle and in peripheral contact with some part of the wheel thereof, and a flexible shaft between the shaft of said wheel and the arbor of the armature of the generator and connecting the same, whereby the former drives the latter.

2. The combination with an electric lamp and generator for a wheeled vehicle, adapted to be secured to the latter and having the arbor of its dynamo-armature projecting from the casing, a friction-wheel and its shaft, mounted rotatively in a bearing-bracket, the said bracket, and means for securing the latter to the vehicle, of a flexible shaft B, secured at one end to the arbor of the dynamo-armature and at the other end to the shaft of the friction-wheel, substantially as and for the purpose set forth.

3. The combination with a wheeled vehicle and an electric lamp and generator mounted thereon, of a bracket $c$ mounted on the vehicle and carrying two shafts, $b$ and $g$, the sheaves $d$ and $f$, fixed on the respective shafts, the belt $e$ on said sheaves, the friction wheel on the shaft $g$ and in peripheral driving contact with the wheel of the vehicle, and the flexible shaft B, connected at one end with the arbor of the armature of the lamp-dynamo, and at the other end with the shaft $b$.

4. The combination with an electric lamp and generator for a vehicle, a bracket carried by the vehicle, a driving-shaft mounted in said bracket, and connecting means between said shaft and the armature-arbor of the dynamo, whereby the former drives the latter, of a friction-wheel mounted loosely on said driving-shaft and bearing one member of a friction-clutch, the other member of said clutch splined on the driving-shaft, a spring adapted to hold the splined member of the clutch in engagement with the other member, a sliding collar $t$ on the driving-shaft, two springs, $u, u$, coupled at one end to lugs on the splined clutch member and at the other end to lugs on the said sliding collar, governor-balls $v$ on the respective springs $u$, and a stop-collar $w$, secured adjustably on the shaft to arrest and limit the movement of said sliding collar.

In witness whereof I have hereunto signed my name in the presence of two subscribing witnesses.

ALFRED M. RODRIGUEZ.

Witnesses:
PETER A. ROSS,
HENRY CONNETT.